United States Patent [19]

Dreher et al.

[11] 4,010,912
[45] Mar. 8, 1977

[54] APPARATUS FOR COLLECTING WEBS OF PHOTOGRAPHIC PAPER OR THE LIKE

[75] Inventors: Karl Dreher, Munich; Adolf Fleck, Unterhaching; Christian Götze; Ernst Ismann, both of Munich; Mathias Pflugbeil, Baldham, all of Germany

[73] Assignee: AGFA-Gevaert, A.G., Leverkusen, Germany

[22] Filed: Sept. 24, 1975

[21] Appl. No.: 616,418

[30] Foreign Application Priority Data

Sept. 26, 1974 Germany .................... 2445998

[52] U.S. Cl. .................... 242/67.1 R; 242/74; 242/76; 242/195
[51] Int. Cl.² ............ B65H 17/02; B65H 75/28
[58] Field of Search ........... 242/74, 74.1, 78.3, 242/195, 205, 210, 76, 67.1 R; 352/157, 158

[56] References Cited

UNITED STATES PATENTS

| | | | |
|---|---|---|---|
| 2,111,054 | 3/1938 | Paul | 242/76 |
| 3,233,839 | 2/1966 | Reinsch | 242/74 X |
| 3,270,974 | 9/1966 | Eagle | 242/74 X |
| 3,357,653 | 12/1967 | Otsuka | 242/74 |
| 3,802,646 | 4/1974 | Nagel et al. | 242/195 |

Primary Examiner—George F. Mautz
Assistant Examiner—John M. Jillions
Attorney, Agent, or Firm—Michael J. Striker

[57] ABSTRACT

Apparatus for collecting webs of photographic paper issuing from a photographic copying machine has a magazine which is attachable to the copying machine and contains a wheel having a slotted periphery for introduction of the leader of a web by way of a channel defined by a guide which is pivotably mounted in the magazine. The channel extends radially of the wheel during introduction of the leader so that the latter can enter the interior of the wheel. The wheel is thereupon driven to convolute the web about it periphery and to automatically propel the guide to a position in which the channel is tangential to the wheel. The guide is then intercepted and held against pivotal movement in a direction to locate the channel radially of the wheel, and the guide has a roller which rests on the outermost convolution of the roll of paper which accumulates on the wheel. The intercepting device is a spring-biased lever which allows the guide to locate the channel radially of the wheel in response to attachment of the magazine to the copying machine.

18 Claims, 4 Drawing Figures

APPARATUS FOR COLLECTING WEBS OF PHOTOGRAPHIC PAPER OR THE LIKE

BACKGROUND OF THE INVENTION

The present invention relates to apparatus for collecting webs of photographic paper or the like. More particularly, the invention relates to improvements in apparatus for winding or convoluting webs of flexible sheet material on a rotary collecting member so that a convoluted web forms a roll whose convolutions surround the periphery of the collecting member.

It is already known to place the leader of a flexible web adjacent to or to introduce the leader into a rotary collecting member and to thereupon set the collecting member in rotary motion so that the web is convoluted onto the collecting member. If the leader is not fixedly connected with the collecting member, the latter is likely to rotate relative to the leader and is thus incapable of convoluting or winding the web. Positive attachment of the leader to the collecting member is not always possible, for example, when the collecting member is confined in a magazine or another container. It was therefore proposed to feed the web toward the collecting member at the exact peripheral speed of that portion of the rotating member which collects or convolutes the web. Such collecting apparatus are satisfactory; however, the cost of mechanisms which insure proper synchronization between the forward movement of the web and the angular movement of the collecting member is very high and, moreover, such mechanisms occupy much room in or in the region of a photographic copying machine.

The commonly owned U.S. Pat. No. 3,802,646 to Nagel et al. discloses a modified apparatus wherein the leader of the web is caused to pass through a pivotable guide and enters a transverse slot which is machined into the core of a rotary web collecting member. The core must be moved to a predetermined angular position with respect to the guide to thus insure that the leader will automatically enter the inlet of the slot. The patented apparatus further comprises an apertured sleeve which can be slipped onto the core only when the inlet of the slot in the core registers with an opening of the sleeve. The patented apparatus is also quite expensive because it comprises a substantial number of driven and other parts.

SUMMARY OF THE INVENTION

An object of the invention is to provide a novel and improved apparatus for collecting webs of flexible material, particularly webs of photographic paper issuing from a photographic copying machine, and to construct and assemble the apparatus in such a way that its bulk and cost are a small fraction of the bulk and cost of presently known apparatus.

Another object of the invention is to provide the apparatus with a novel and improved web collecting member.

A further object of the invention is to provide an apparatus wherein the web need not be positively fed during winding onto the collecting member and wherein the photosensitive emulsion of the web is unlikely to be adversely affected (e.g., exposed in response to exertion of undue pressure during winding of the web onto the collecting member.

An additional object of the invention is to provide a novel and improved web collecting apparatus which can be used as a simple, compact and inexpensive means for collecting successive webs issuing from a photographic copying machine, for transporting collected webs to a developing machine, and for feeding webs into the developing machine.

Still another object of the invention is to provide an apparatus which prevents unwinding of collected webs during transport from the copying to the developing machine and wherein the web which is being wound or unwound is invariably held in an optimum position with respect to the collecting member.

The invention is embodied in an apparatus for collecting webs of flexible material, particularly relatively wide, relatively narrow or medium-width webs of photographic paper which issue (either continuously or intermittently) from a photographic copying machine and are intended to be fed into a suitable developing machine.

The apparatus comprises a preferably cylindrical rotary collecting member having a slotted periphery for introduction of the leader of an elongated flexible web, means for rotating the collecting member in a direction to convolute the web about the periphery of the collecting member once the leader of the web has entered the collecting member whereby the convolutions of the web form a growing roll surrounding the collecting member, and guide means defining an elongated channel through which the web passes on its way toward the collecting member (and preferably also during unwinding of the convoluted web, i.e., while the collecting member is rotated to pay out the web). The guide means is movable (preferably pivotable) between a first position in which the channel extends substantially radially of the collecting member so as to introduce the leader of a fresh web into the interior of the collecting member by way of one of the slots, and a second position in which the channel is substantially tangential to the periphery of the collecting member (the collecting member preferably comprises means for automatically propelling the guide means from the first to the second position in response to actuation of the means for rotating the collecting member). The apparatus further comprises intercepting means (e.g., a pivotable lever) which is movable between operative and inoperative positions in which the intercepting means respectively prevents and permits movement of the guide means from the second to the first position. The arrangement may be such that the intercepting means is permanently biased to the operative position and is caused to temporarily assume the inoperative position during attachment of a magazine for the collecting member to a photographic copying machine to thus enable the guide means to assume the first position by gravity. The guide means is free to move beyond the second position in response to growing of the roll on the collecting member.

Since the guide means is automatically moved to the second position when the collecting member starts to rotate and is thereupon intercepted to prevent its movement back to the first position, the weight or oscillations of the guide means cannot cause pressure-induced exposure of photosensitive emulsion on the web which is being convoluted on the collecting member.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
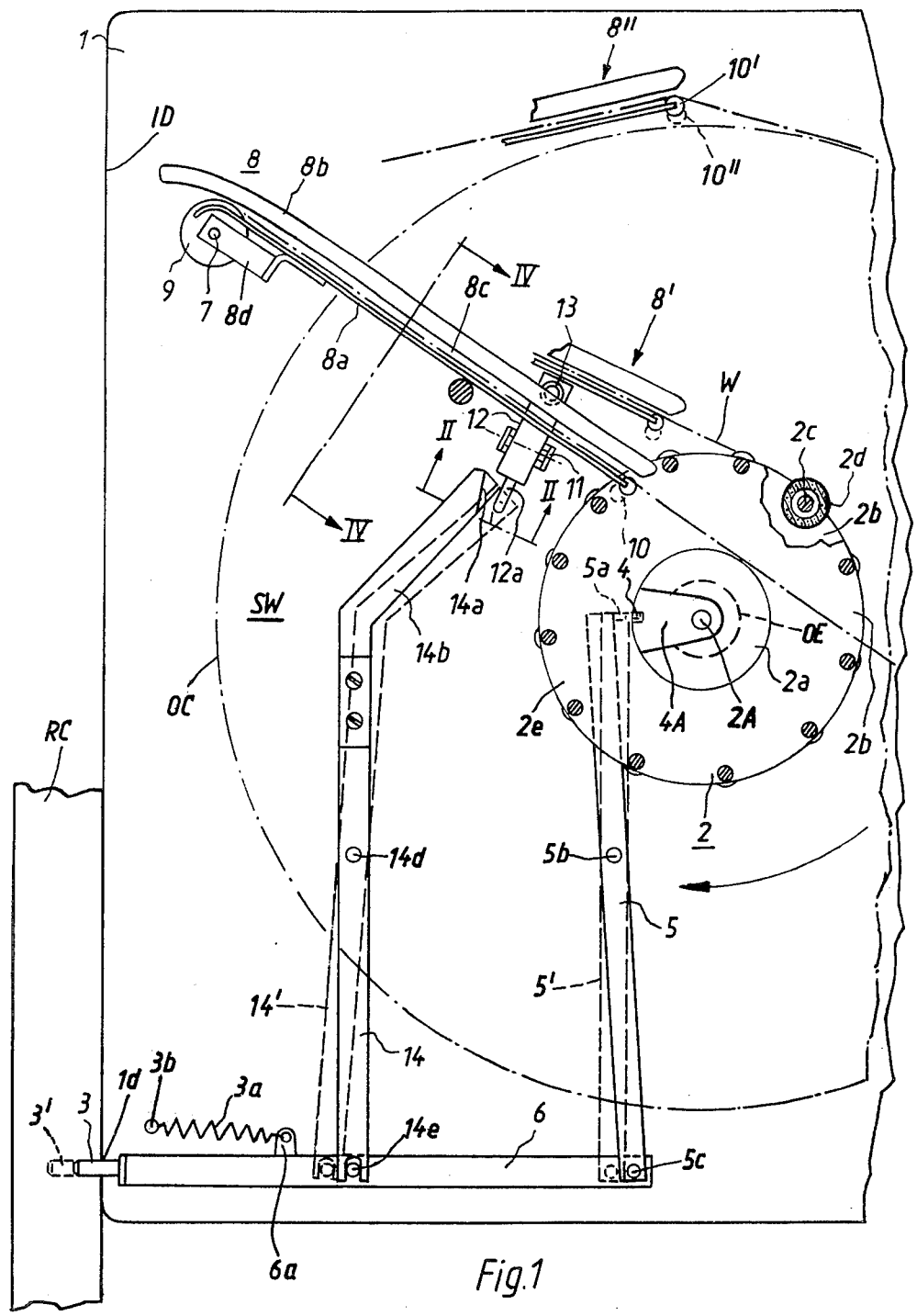
FIG. 1 is a fragmentary schematic central longitudinal sectional view of an apparatus which embodies the invention.

Referring to FIG. 1, there is shown a web collecting apparatus which can be used in or with a photographic roll copying machine. The apparatus includes a magazine or cassette 1 which can be separably secured to a copying machine (a portion shown at RC). The machine RC comprises a drive including a step-down transmission having an output element OE which can be coupled (or is automatically coupled) to a rotary web circular cylindrical collecting member 2 (hereinafter called wheel for short). The magazine 1 has an opening 1d for a pin-shaped sensing element or feeler 3 which assumes the broken-line position 3' when the magazine is detached from the copying machine RC but is automatically moved to the solid-line position of FIG. 1 when the magazine is properly secured to the copying machine. A helical spring 3a is attached to a post 3b in the magazine 1 and to a lug 6a of a motion-transmitting member or slide 6, and tends to maintain the feeler 3 in the extended position 3'.

The wheel 2 has a smooth cylindrical core or hub 2a mounted on a shaft 2A which is journalled in the magazine 1 and receives torque from the output element OE. The shaft 2a is preferably mounted in the magazine 1 in cantilever fashion and the core 2a is non-rotatably secured thereto. The two end portions of the core 2a are rigid with discrete disk-shaped flanges 2b which are parallel to each other and are connected with each other by an annulus of equally spaced rungs 2c. The rungs 2c are parallel to the axis of the core 2a and are adjacent to the peripheries of the flanges 2b. Each rung 2c is preferably a cylindrical rod whose end portions extend into bores machined or otherwise formed in the flanges 2b. That portion of each rung 2c which extends between the flanges 2b is surrounded by a hollow cylindrical envelope here shown as a sleeve or hose 2d consisting of foam rubber or another elastomeric material (e.g., a synthetic plastic substance) having a high coefficient of friction. It is advisable to select a material which prevents slippage of a web W consisting of photographic paper or the like. If the material of the sleeves 2d is a synthetic substance, the latter should be selected with a view to insure that it does not evaporate any softening agent or agents which could adversely affect the photosensitive emulsion coating one side of the web W. The distance between the flanges 2b (i.e., the width of slots 2e between neighboring rungs 2c), as considered in the axial direction of the core 2a, preferably exceeds the width of the widest web W which is intended to be collected on the wheel 2. This insures that the apparatus of FIG. 1 can be used for storage of relatively wide, medium-width or narrow webs without any or with minimal adjustment prior to changing from one width to another.

The shaft 2A is rigid with the core 2a as well as with an arresting disk 4A which is outwardly adjacent to one of the flanges 2b and has a set of equally spaced peripheral notches or sockets 4 each adapted to receive the pallet 5a of an arresting or blocking lever 5. The latter is pivotably mounted in the magazine 1, as at 5b, and is articulately coupled to the slide 6 by means of a pin-and-slot connection 5c. When the spring 3a is free to contract so that the feeler 3 assumes the extended position 3', the pallet 5a of the lever 5 is caused to bear against the periphery of the disk 4A and to enter an oncoming socket 4 to thereby arrest the wheel 2. This takes place when the magazine 1 is detached from the copying machine RC, i.e., when the output element OE is disengaged from the shaft 2A, to thereby insure that the wheel 2 cannot rotate during transport to or from the copying machine RC. The disk 4A may constitute a simple spur gear whose tooth spaces constitute the sockets 4 for the pallet 5a.

The magazine 1 further contains a pivot member 7 which is shown in the upper left-hand portion of FIG. 1 and serves to support a pivotable guide 8 so that the latter can turn back and forth about an axis which is parallel to that of the shaft 2A. The guide 8 has an elongated plate-like flat base portion 8a secured to a bracket 8d which is turnably mounted on the pivot member 7, and a set of several elongated rod-like components 8b together constituting a top portion defining with the base portion an elongated channel or passage 8c for the leader of the web when a fresh web is being threaded into the apparatus. Such leader is introduced through an inlet aperture 1D of the magazine 1. The pivot member 7 further carries an idler roller 9 which facilitates introduction of the leader of a fresh web W into the channel 8c. The idler roller 9 further serves to reduce or prevent friction between the web W and the base portion 8a when the web is being collected by the wheel 2; to this end, the apex of the idler roller 9 extends at least slightly above the upper side of the base portion 8a. The guide 8 further comprises a relatively small roller 10 which is adjacent to the discharge end of the channel 8c and can be mounted at the inner end of the base portion 8a. The roller 10 is freely rotatable about its axis; it rotates by rolling along the outer side of the outermost convolution of a supply or roll SW of convoluted web W as soon as the diameter of the roll increases to a predetermined minimum value. The outermost convolution of a fully grown roll SW is shown at OC. When the roll has grown to maximum size or close to such size, the roller 10 assumes the position 10'; shortly before, the roller 10 assumes the broken-line position 10".

Figure 2:
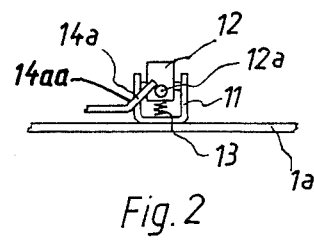
FIG. 2 is a sectional view as seen in the direction of arrows from the line II—II of FIG. 1.
Figure 3:
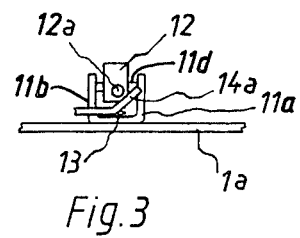
FIG. 3 shows the structure of FIG. 2 but with a disengaging member for intercepting means in a different position.
Figure 4:
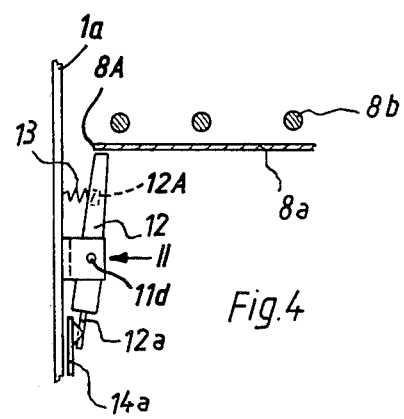
FIG. 4 is a sectional view as seen in the direction of arrows from the line IV—IV of FIG. 1.

One side wall 1a of the magazine 1 (e.g. the rear side wall, as viewed in FIG. 1) supports a substantially U-shaped bearing member 11 (see FIGS. 2 to 4). The latter may consist of deformable metallic sheet material and may be glued, riveted or otherwise fixedly secured to the inner side of the respective side wall 1a. The portions 11a, 11b of the bearing member 11 support a pin 11d for a two-armed intercepting lever 12, one arm of which has a socket or recess 12A for a helical spring 13 reacting against the side wall 1a and tending to pivot the lever 12 clockwise, as viewed in FIG. 4. The other arm of the intercepting lever 12 has an extension 12a (e.g., a post or pin) which can be engaged by a pointed end portion or tooth 14a of a disengaging lever 14 during certain stages of operation or idleness of the improved apparatus. The lever 14 is pivotable in the magazine 1 on a shaft or pin 14d and is articulately coupled to the slide 6 by a pin-and-slot connection 14e. The tooth 14a preferably forms part of a leaf spring 14b which constitutes or forms part of the upper arm of the lever 14. The connection 14e is provided at the lower end of the lower arm of the disengaging lever. The spring 14b may consist of suitable steel which is sufficiently elastic to be deformable in a manner to be described hereinafter. When idle, the leaf spring 14b bears against the inner side of the side wall 1a. The tooth 14a has an inclined cam face 14aa.

The operation:

The apparatus is transferrable or shiftable between the copying machine RC where it receives and convolutes a fresh web W and a developing machine (not shown) where the convoluted web is paid out and passes through one or more developing stages in a manner not forming part of the invention. In the copying machine RC, successive portions of a photosensitive emulsion coating one side of the web W are exposed to light so that the web which is convoluted on the wheel 2 carries exposed but undeveloped images of a series of film frames. After developing, the web is severed to yield discrete prints which are sent to or picked up by dealers or directly by customers. Conveying means may be provided for moving the apparatus between the copying machine RC and the developing machine.

When the magazine 1 is empty, e.g., when the apparatus is being returned from the developing machine to the copying machine RC, the guide assumes an intermediate or second position 8' in which the channel 8c is substantially or exactly tangential to the flanges 2b of the wheel 2. The guide 8 assumes the position 8' because the extension 12a of the intercepting lever 12 is not displaced by the tooth 14a of the leaf spring 14b. This is due to the fact that the spring 3a is free to contract and to thus maintain the feeler 3 in the extended position 3'. Consequently, the disengaging lever 14 assumes the broken-line position 14' of FIG. 1 and the tooth 14a allows the spring 13 to expand and to move the upper arm of the intercepting lever 12 below the base portion 8a of the guide 8 (see FIG. 4). In such operative position, the lever 12 prevents the guide from pivoting clockwise to the (first) position 8 of FIG. 1 in which the channel 8c extends substantially tangentially of the core 2a, i.e., substantially radially of the wheel 2.

When the magazine 1 is attached to the copying machine RC, the latter depresses the feeler 3 against the opposition of the spring 3a so that the slide 6 moves the disengaging lever 14 to the solid-line position of FIG. 1. At the same time or slightly prior to movement of lever 14 to the solid-line position, the slide 6 moves the lever 5 from the broken-line position 5' to the solid-line position of FIG. 1 in which the channel 8c extends substantially tangentially of the core 2a, i.e., substantially radially of the wheel 2.

When the magazine 1 is attached to the copying machine RC, the latter depresses the feeler 3 against the opposition of the spring 3a so that the slide 6 moves the disengaging lever 14 to the solid-line positon of FIG. 1. At the same time (or slightly prior to movement of lever 14 to the solid-line position, the slide 6 moves the lever 5 from the broken-line position 5' to the solid-line position of FIG. 1 so that the pallet 5a is withdrawn from the adjacent socket 4 of the disk 4A and the wheel 2 is free to rotate. The wheel 2 was held against rotation during transport from the developing machine to the machine RC.

When the disengaging lever 14 pivots toward the solid-line position of FIG. 1, its pallet 14a moves from the position of FIG. 3 to the position of FIG. 2 whereby the cam face 14aa of the pallet temporarily pivots the intercepting lever 12 through the medium of the extension 12a so that the upper arm of the lever 12 moves away from the underside of the base portion 8a (inoperative position of the lever 12). The guide is then free to pivot by gravity (clockwise, as viewed in FIG. 1) so that it moves to the first position 8 of FIG. 1 or close to such first position, depending upon whether the innermost part of the base portion 8a strikes against a sleeve 2d or comes to rest in the slot 2e between two neighboring sleeves. FIG. 1 shows the guide in that (first) position in which the innermost part of the base portion 8a is located between two neighboring sleeves 2d so that the channel 8c is exactly or nearly tangential to the core 2a of the wheel 2. The upper arm of the intercepting lever 12 then abuts against one edge face 8A of the base portion 8a. The spring 13 can expand to a certain extent as soon as the cam face 14aa moves beyond the extension 12a (during travel of the tooth 14a from the position of FIG. 3 to the position of FIG. 2); however, the spring 13 cannot return the intercepting lever 12 to the operative position of FIG. 4 because the upper arm of this lever abuts against the edge face 8A of the base portion 8a.

If the base portion 8a strikes against a sleeve 2d (while the guide moves from the second position 8' toward the first position 8 of FIG. 1), the guide rotates the wheel 2 counterclockwise, as viewed in FIG. 1, so that the inner end of the base portion 8a is free to enter the slot 2e between two neighboring sleeves 2d as soon as the wheel 2 completes a relatively small angular movement. It will be recalled that the wheel 2 is free to rotate as soon as the feeler 3 is depressed by the copying machine RC. Thus, irrespective of whether or not the base portion 8a strikes against the adjacent sleeve 2d, the guide automatically assumes the first position 8 in response to depression of the feeler 3 to the solid-line position of FIG. 1.

The leader of a web W is thereupon threaded into the apparatus, either by hand or by resorting to an automatic threading mechanism. Such leader passes through the aperture 1D and thereupon enters the outer end of the channel 8c between the idler roller 9 and the rod-like components 8b of the guide. The leader can be pushed inwardly with the exertion of a minimal force so that it leaves the channel 8c in the region of the roller 10 and enters the space between the flanges 2b of the wheel 2 substantially tangentially of the core 2a. The threading operation can be terminated when the space between the flanges 2b receives a certain length of the fresh web W, e.g., a length in the range of a few centimeters.

The copying machine RC is assumed to be of the type wherein several exposed portions of a web of photographic paper are temporarily stored in a chamber or compartment. Such types of roll copying machines are well known. When the chamber is filled, its contents must be evacuated from the copying machine RC. This is achieved by starting the drive including the output element OE so that the wheel 2 begins to rotate in a clockwise direction, as viewed in FIG. 1. The drive can be started automatically when the aforementioned chamber of the copying machine RC receives a predetermined length of web W. Since the foremost part of the fresh web W extends into the space between the flanges 2b, it is frictionally engaged by one of the sleeves 2d as soon as the wheel 2 begins to rotate in a clockwise direction. Such frictional engagement between the sleeve 2d and the leader is sufficient to insure that the web W is pulled from the chamber of the copying machine RC and is convoluted onto the annulus of sleeves 2d, i.e., the roll SW begins to grow. As a rule, the web W is set in motion rather abruptly so that it (or the oncoming sleeve 2d) suddenly pivots the guide in a counterclockwise direction whereby the spring 13 is free to expand and pivots the intercepting lever 12 back to the operative position of FIG. 4 in which the upper arm of this lever is located below the base portion 8a and maintains the guide in the second position 8', i.e., the guide is abruptly pivoted from the innermost or first position in which the channel 8c is tangential to the core 2a to the second position 8' in which the channel 8c is tangential to the flanges 2b. The guide can continue to pivot in one direction (i.e., counterclockwise toward the position 8''); however, it cannot pivot back toward the first position 8 because the intercepting lever 12 is located in the path of clockwise movement of the base portion 8a. The guide then causes its roller 10 to rest by gravity on the outermost convolution of the growing roll SW so that the guide automatically continues to pivot counterclockwise as the diameter of the roll SW grows. When the diameter of the roll S reaches a predetermined maximum value (see the convolution OC of the web W), the guide assumes the outermost position 8'' whereby the roller 10 (in the position 10') rests on the convolution OC. The web W is thereupon severed in the copying machine RC so that the magazine 1 can be transferred to the developing machine. The trailing end of the severed web W preferably extends outwardly through the aperture 1D so that it can be readily introduced into the developing machine which has suitable means for advancing the web in a direction to unwind it from the wheel 2. During unwinding, the web W passes through the channel 8c whereby the guide pivots clockwise, as viewed in FIG. 1, in response to reduction of the diameter of the roll SW. It will be readily appreciated that the developing machine also comprises means for depressing the feeler 3 when the magazine 1 is properly positioned with respect to the developing machine so that the pallet 5a is withdrawn from the adjacent notch 4 of the disk 4A and the latter allows the wheel 2 to rotate in a direction to pay out the web. During depression of the feeler 3 by the developing machine, the pallet 14a moves from the position of FIG. 3 to the position of FIG. 2 but with no lasting effect upon the position of the intercepting lever 12 because the guide is in the position 8'' of FIG. 1, i.e., the base portion 8a is remote from the upper arm of the lever 12 so that the latter can reassume the operative position shown in FIG. 4 under the action of the spring 13 as soon as the tooth 14a reaches the position of FIG. 2.

As the advancing means of the developing machine draws the web W from the interior of the magazine 1, the diameter of the roll SW decreases and the guide pivots from the position 8'' toward the second position 8' of FIG. 1. When the guide reaches the position 8', the underside of the base portion 8a comes into abutment with the upper arm of the lever 12 so that the guide is intercepted in the position 8' and cannot pivot toward the first position 8. The channel 8c is then substantially tangential to the flanges 2b so that the entire web W can be readily withdrawn from the magazine 1. The apparatus is then ready to be returned to the copying machine RC to receive and convolute the next-following web. Of course, when the magazine 1 is detached from the developing machine, the spring 3a pushes the feeler 3 to the extended position 3' and the slide 6 causes the blocking lever 5 to move its pallet 5a against the periphery of the disk 4A. If the pallet 5a does not immediately enter a notch 4, it automatically enters an oncoming notch in response to slight angular displacement of the wheel 2 during detachment from and/or during transport back to the position of FIG. 1. Actually, eventual rotation of the wheel 2 during transport toward the copying machine RC is of no consequence since the magazine 1 does not contain a web. As a rule, the position of notches 4 will be selected in such a way that, if the pallet 5a extends into one of the notches 4 and the slide 6 thereupon pivots the lever 5 to the broken-line position 5', the guide can descend by gravity from the second position 8' to the first position 8 of FIG. 1 as soon as the lever 14 disengages the intercepting lever 12 from the base portion 8a. Such disengagement of intercepting lever 12 from the base portion 8a of the guide takes place in automatic response to attachment of magazine 1 to the copying machine RC because the feeler 3 is depressed to the solid-line position of FIG. 1 so that the lever 14 pivots from the position 14' to the solid-line position practically simultaneously with or immediately after pivoting of lever 5 from the position 5' to the solid-line position of FIG. 1.

The purpose of the leaf spring 14b is to enable the disengaging lever 14 to pivot from the position 14' to the solid-line position or vice versa, i.e, that the tooth 14a can move to the position of FIG. 2 or to the position of FIG. 3. Flexing of the leaf spring 14b has no effect upon the position of the intercepting lever 12 because the extension 12a cannot pivot clockwise beyond the position of FIG. 4. The blocking means 4A, 5 constitutes a desirable and advantageous feature of the apparatus; its primary function is to prevent rotation of the wheel 2 and roll SW during transport of the magazine 1 from the copying machine RC to the developing machine because clockwise rotation of the wheel 2 could result in concealment of the trailing end of the web W in the interior of the magazine.

An important advantage of the improved apparatus is that the guide automatically assumes the first position 8 when the magazine 1 is properly attached or positioned with respect to the copying machine RC. The channel 8c then extends substantially radially of the wheel 2, e.g., it can extend tangentially of the core 2a whose diameter is smaller than the diameters of the flanges 2b, so that the leader of a web W which is being pushed into and beyond the channel 8c automatically finds its way into the interior of the wheel and thereupon begins to form a growing roll SW as soon as the wheel 2 is set in rotary motion.

Another important advantage of the improved apparatus is that the guide assumes the second position 8' as soon as the wheel 2 begins to rotate in a direction to collect the web W so that the channel 8c is then tangential to the wheel and allows for practically unobstructed travel of the web toward the wheel while the roll SW grows. The intercepting lever 12 automatically prevents return movement of the guide from the second position 8' to the first position 8 as soon as the guide is propelled to the position 8'.

A further important advantage of the improved apparatus is that the guide can pivot freely beyond the second position 8' and toward the position 8" while the roll SW grows so that the channel 8c remains tangential to the outermost convolution of the roll irrespective of the momentary diameter of the roll. This contributes to satisfactory winding of the web.

The intercepting lever 12 performs an important function during the initial stage of winding of a fresh web W onto the wheel 2. Tension in the leader of a fresh web W increases abruptly when the wheel 2 is set in rotary motion in a direction to collect the web. Since the guide is automatically lifted from the position 8 to and temporarily beyond the position 8' of FIG. 1 when the wheel 2 begins to rotate (preferably and primarily by the oncoming sleeve 2d which strikes against the underside of the base portion 8a), the leader of the web could be extracted from the interior of the wheel 2 if the guide 8 were permitted to descend by gravity (clockwise, as viewed in FIG. 1) and to strike upon the adjacent portion of the web W while the wheel begins to rotate. Eventual oscillations of the guide from the position 8' of FIG. 1 are damped by the upper arm of the intercepting lever 12, and this lever limits the oscillations to those which take place between the positions 8' and 8" but does not permit the base portion 8a to repeatedly contact the web which is being convoluted onto the wheel 2. The outermost convolution of the web W engages and begins to pivot the guide counterclockwise (from the position 8' toward the position 8") after the number of convolutions on the wheel 2 is amply sufficient to prevent any slippage of the web with respect to the wheel 1, i.e., when the growing roll SW can safely pivot the guide against the action of gravity.

An additional important feature of the intercepting lever 12 is that it prevents pressure-induced exposure of certain portions of photosensitive emulsion on the web W. Such exposure could take place if the innermost part of the base portion 8a and/or the roller 10 were permitted to strike against the web W on the wheel 2 during the aforediscussed oscillation of the guide. The latter's base portion 8a rests, without any oscillation, on the upper arm of the intercepting lever 12 when the diameter of the roll SW has grown sufficiently to enable the roll to begin with pivoting of the guide from the position 8' toward the position 8". In the absence of prevention of pressure-induced exposures of a web of photographic paper, the leader of the web (and a substantial length behind the leader) would have to be discarded upon withdrawal of the web from the magazine 1 at the developing station. Alternatively, the web would have to be without an emulsion on the leader or it would have to be conveyed through the copying machine RC in such a way that the leader would not be exposed to printing light. This would complicate the manufacture of the web as well as the operation of copying and developing machines.

The improved apparatus is susceptible to many modifications without departing from the spirit of the invention. For example, the entire wheel may consist of a material having a high coefficient of friction; such modified wheel may resemble a circular cylinder having slots extending inwardly from its periphery and corresponding to spaces or slots 2e between neighboring sleeves 2d of FIG. 1. All that counts is to insure that the introduction of a relatively short portion of the leader of a fresh web into the interior of the wheel suffices to guarantee that the web will not slide relative to the wheel or vice versa when the wheel is set in rotary motion in a direction to collect the web.

It is also possible to replace the lever 14 with a two-piece lever whose parts are coupled to each other by a pivot or by another suitable articulate connection and one of which is biased to a predetermined position relative to the other part by yieldable resilient means performing the function of the leaf spring 14b.

Still further, and if the bias of the spring 3a is sufficiently strong, the pallet 5a can be replaced with a shoe and the notches 4 omitted; the shoe then frictionally engages the periphery of the disk 4A as soon as the feeler 3 is caused to assume the extended position 3'. All such and other modifications will be readily comprehended on the basis of preceding description without additional illustrations.

Without further analysis, the foregoing will so fully reveal the gist of the present invention that others can by applying current knowledge readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. Apparatus for collecting webs of flexible material, particularly webs of photographic paper issuing from a copying machine, comprising a rotary collecting member having a slotted periphery for introduction of the leader of a web; means for rotating said member in a direction to convolute the web about said periphery once the leader of such web has entered said member whereby the convolutions of the web form a growing roll surrounding said member; guide means defining an elongated channel through which the web passes on its way toward said member, said guide means being movable between a first position in which said channel extends substantially radially of said member so as to introduce the leader into the interior of said member and a second position in which said channel is substantially tangential to said periphery; means for propelling said guide means from said first to said second position in response to actuation of said rotating means; and intercepting means movable between operative and inoperative positions in which said intercepting means respectively prevents and permits the movement of said guide means from said second to said first position.

2. Apparatus as defined in claim 1, and means mounting said guide means for pivotable movement between said positions thereof.

3. Apparatus as defined in claim 1, wherein said guide means comprises means for compelling said guide means to move beyond said second position in response to continued rotation of said member in said direction and an increase in the diameter of said roll.

4. Apparatus as defined in claim 1 for collecting webs having different widths including webs of maximum width and webs of minimum width, wherein said collecting member is a circular cylinder and said periphery thereof has a plurality of slots each having a width, as considered in the axial direction of said cylinder, which at least equals said maximum width.

5. Apparatus as defined in claim 1 wherein said guide means comprises an end portion adjacent to said collecting member and a roller mounted on said end portion and arranged to rest on the outermost convolution of the growing roll which surrounds the periphery of said member.

6. Apparatus as defined in claim 1, wherein said collecting member comprises a cylindrical core, two flanges coaxial with and flanking said core, and an annulus of rungs extending between said flanges and spaced apart from said core, said rungs being spaced apart from each other so that the neighboring rungs of said annulus define a plurality of slots.

7. Apparatus as defined in claim 6, wherein said collecting member further comprises envelopes surrounding said rungs and consisting of a material having a high coefficient of friction.

8. Apparatus as defined in claim 7, wherein said envelopes are cylindrical sleeves.

9. Apparatus as defined in claim 7, wherein said envelopes consist of foamed elastomeric material.

10. Apparatus as defined in claim 1, wherein said intercepting means is pivotable between said positions thereof and further comprising means for biasing said intercepting means to said operative position.

11. Apparatus as defined in claim 1, further comprising means for moving said intercepting means to said inoperative position prior to introduction of the leader of a web into said channel so that said guide means can assume said first position to thereby insure that the leader enters the interior of said collecting member.

12. Apparatus as defined in claim 11, wherein said moving means comprises a mobile sensing element, means for shifting said sensing element, and means for displacing said intercepting means from said operative to said inoperative position in response to shifting of said sensing element.

13. Apparatus as defined in claim 11, wherein said moving means comprises a displacing member which is movable between first and second positions in each of which said displacing member allows said intercepting means to assume said operative position thereof, said displacing member including a portion arranged to move said intercepting means to said inoperative position during movement of said displacing member from one to the other position thereof.

14. Apparatus as defined in claim 13, wherein said portion of said displacing member is elastic.

15. Apparatus as defined in claim 14, wherein said elastic portion includes a leaf spring.

16. Apparatus for collecting webs of flexible material, particularly webs of photographic paper issuing from a copying machine, comprising a rotary collecting member having a slotted periphery for introduction of the leader of a web; means for rotating said member in a direction to convolute the web about said periphery once the leader of such web has entered said member whereby the convolutions of the web form a growing roll surrounding said member; guide means defining an elongated channel through which the web passes on its way toward said member, said guide means being movable between a first position in which said channel extends substantially radially of said member so as to introduce the leader into the interior of said member and a second position in which said channel is substantially tangential to said periphery; intercepting means movable between operative and inoperative positions in which said intercepting means respectively prevents and permits the movement of said guide means from said second to said first position; moving means for moving said intercepting means to said inoperative position prior to introduction of the leader of a web into said channel so that said guide means can assume said first position to thereby insure that the leader enters the interior of said collecting member, said moving means comprising a mobile sensing element, means for shifting said sensing element, and means for displacing said intercepting means from said operative to said inoperative position in response to shifting of said sensing element; and a magazine for said collecting member, said guide means, said intercepting means and said moving means, said sensing element normally extending from said magazine and said means for shifting said sensing element including a portion of photographic copying machine which feeds the web into said magazine for collection by said member.

17. Apparatus as defined in claim 16, wherein said magazine is separably connectable to said copying machine and said portion of said machine automatically shifts said sensing element in response to connection of said magazine to said machine.

18. Apparatus for collecting webs of flexible material, particularly webs of photographic paper issuing from a copying machine, comprising a rotary collecting member having a slotted periphery for introduction of the leader of a web; means for rotating said member in a direction to convolute the web about said periphery once the leader of such web has entered said member whereby the convolutions of the web form a growing roll surrounding said member; guide means defining an elongated channel through which the web passes on its way toward said member, said guide means being movable between a first position in which said channel extends substantially radially of said member so as to introduce the leader into the interior of said member and a second position in which said channel is substantially tangential to said periphery; intercepting means movable between operative and inoperative positions in which said intercepting means respectively prevents and permits the movement of said guide means from said second to said first position, said member comprising means for propelling said guide means from said first to said second position in response to actuation of said rotating means; and means for biasing said intercepting means to said operative position so that said intercepting means automatically assumes said operative position when said propelling means propels said guide means to said second position.

* * * * *